United States Patent [19]

Oswald

[11] Patent Number: 5,352,309
[45] Date of Patent: Oct. 4, 1994

[54] METHOD FOR MANUFACTURING PIPE BELLS

[75] Inventor: Kenneth J. Oswald, Little Rock, Ark.

[73] Assignee: Smith Fiberglas Products Inc., Milwaukee, Wis.

[21] Appl. No.: 980,138

[22] Filed: Nov. 23, 1992

Related U.S. Application Data

[63] Continuation of Ser. No. 740,364, Aug. 5, 1991, abandoned.

[51] Int. Cl.5 .................... F16L 47/00; B32B 31/16
[52] U.S. Cl. .................... 156/154; 156/153; 156/158; 156/175; 156/293; 156/304.2; 156/304.5; 285/288; 285/423; 285/919; 138/109
[58] Field of Search ............ 156/169, 173, 172, 175, 156/158, 304.2, 304.5, 293, 294, 153, 154; 285/423, 288, 919; 138/109

[56] References Cited

U.S. PATENT DOCUMENTS

| | | | |
|---|---|---|---|
| 2,843,153 | 7/1958 | Young | 156/175 X |
| 3,156,489 | 11/1964 | Deringer | 285/919 X |
| 3,388,932 | 6/1968 | Bradley | 156/158 X |
| 3,499,815 | 3/1970 | Hof . | |
| 3,540,328 | 11/1970 | Foss | 82/113 |
| 3,613,320 | 10/1971 | Mighton | 82/113 X |
| 3,893,263 | 7/1975 | Jackman et al. | 51/237 R X |
| 4,108,700 | 8/1978 | Clodfelter | 156/154 X |
| 4,625,601 | 12/1986 | Brummet | 82/113 |
| 4,747,431 | 5/1988 | LaCount et al. | 138/109 |

OTHER PUBLICATIONS

Rosato, D. V., "Filament Winding: its development, manufacture, applications, and design," 1964, p. 193.

Primary Examiner—Jeff H. Aftergut
Attorney, Agent, or Firm—James E. Lowe, Jr.; David R. Price

[57] ABSTRACT

A method for manufacturing a filament reinforced plastic pipe including an integral bell, the method comprising the steps of winding a filament bundle, in a plurality of layers, around a mandrel having a cylindrical outer surface to form a pipe including a bell portion having a cylindrical inner surface, and machining the inner surface so that the inner surface is tapered.

4 Claims, 2 Drawing Sheets

METHOD FOR MANUFACTURING PIPE BELLS

This is a continuation of copending application(s) Ser. No. 07/740,364 filed on Aug. 5, 1991, now abandoned.

BACKGROUND OF THE INVENTION

The invention relates to pipes having integral bells, and more particularly to methods for manufacturing bells on filament wound pipes.

U.S. Pat. No. 3,499,815 discloses a method for manufacturing a filament wound pipe. This patent does not disclose a method for manufacturing a bell on such a pipe. It is known, however, as illustrated schematically in FIG. 1 of the drawings, to manufacture an integral bell on such a pipe by using a mandrel with a tapered or frustoconical outer surface portion that causes the pipe wall to have a corresponding flared or diverging end portion forming an integral bell. The bell portion is reinforced by winding additional layers of filament around the mandrel in the area of the bell portion. More particularly, a pipe 2 is formed by winding a plurality of layers 4 of filament bundles around a mandrel 6 having a frustoconical surface portion 8 that forms the bell portion of the pipe 2. Several additional layers 4 of filament bundles are wound around the bell portion to provide necessary reinforcement of the pipe wall to bell transition area.

SUMMARY OF THE INVENTION

The invention provides an improved method for manufacturing a filament reinforced plastic pipe with an integral bell. The method is more economical than and produces a stronger pipe than known prior art methods. The invention also permits a length of pipe to be manufactured with integral bells on both ends.

More particularly, the invention utilizes a mandrel having an outer surface which is cylindrical along its entire length, rather than being flared or frustoconical at one end. Filament bundles impregnated with a resin are wound around the mandrel to form a pipe having an inner surface which is cylindrical along its entire length. The integral bell is formed by adding additional layers of filament bundles adjacent one end of the pipe. The inner surface of the bell portion is then machined so as to be frustoconical. This provides the end of the pipe with an integral bell having an outwardly tapered inner surface. Bells can be formed on both ends of the pipe, if desired.

Other features and advantages of the invention will become apparent to those skilled in the art upon review of the following detailed description, claims and drawings.

Figure 2:
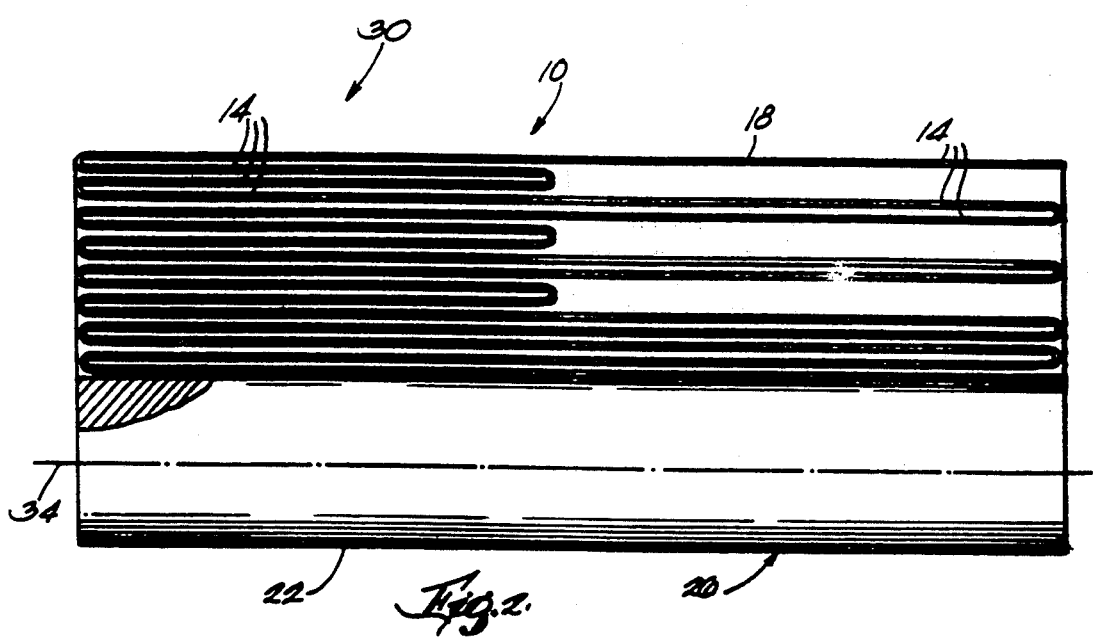
FIG. 2 is an illustration similar to FIG. 1 of a pipe being manufactured by the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Figure 3:
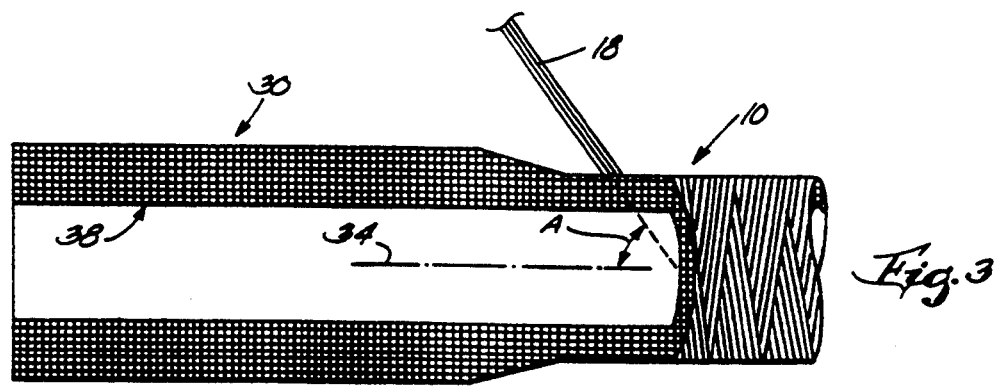
FIG. 3 is a partial view, partially in section, of a pipe formed by the invention prior to the step of grinding the inner surface of the pipe.

As shown in FIGS. 2 and 3, the invention comprises the step of forming a filament reinforced plastic pipe 10 by winding a plurality of layers 14 of a filament bundle 18, such as fiberglass, around a mandrel 22 having a cylindrical outer surface 26. Additional layers 14 of filament bundles 18 are wound around the mandrel 22 adjacent one end to provide the pipe 10 with a bell portion 30 extending from the end of the pipe 10. Specifically, as shown schematically in FIG. 2, the majority of the pipe 10 is formed by ten layers of filament bundles 18, and the bell portion 30 is reinforced with six additional layers of filament bundles 18. The axial length of the bell portion 30 (the length of the bell portion 30 from left to right in FIG. 3) is known as the "reinforcement length." Because the outer surface 26 of the mandrel 22 is cylindrical, the bell portion 30 of the pipe 10 initially has a cylindrical inner surface 38.

More specifically, for a six inch diameter aromatic amine cured epoxy pipe reinforced with fiberglass, each filament bundle layer is about 0.013 inches thick. The pipe 10 is wound by first tying a bundle on the spigot end of the pipe, then winding five layers the entire length of the pipe 10, winding two layers of bell reinforcement, winding two more layers the entire length of the pipe 10, winding two more layers of bell reinforcement, winding another layer the entire length of the pipe 10, and then cutting off the bundle at the spigot end of the pipe.

Figure 4:
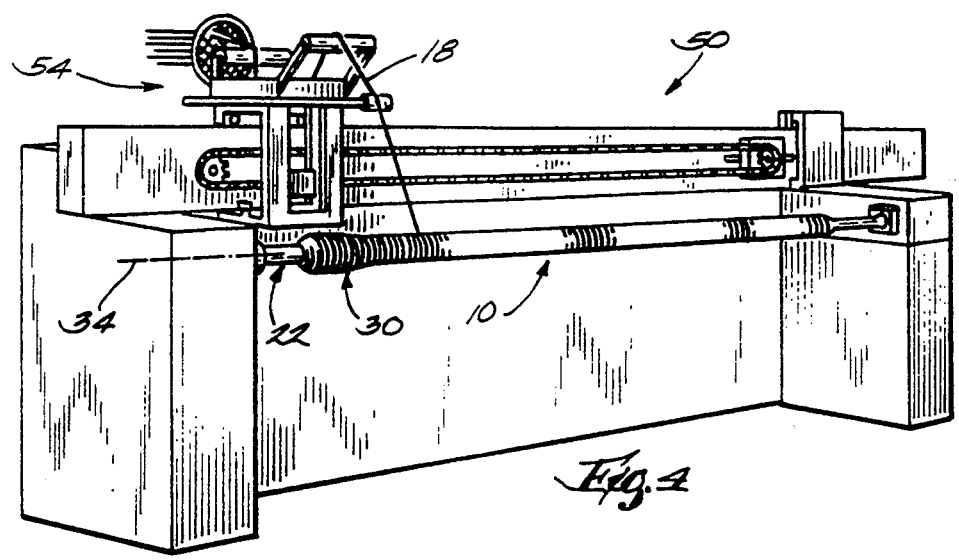
FIG. 4 is a perspective view of an apparatus used in performing the invention.

An apparatus 50 for performing the above-described steps of the method is illustrated in FIG. 4. The apparatus 50 is preferably identical to the apparatus disclosed in U.S. Pat. No. 3,499,815, which is incorporated herein by reference. The apparatus 50 comprises the mandrel 22, and means for winding the filament bundles 18 around the mandrel 22. The winding means includes means 54 for impregnating the filament bundles 18 with a resin before winding the filament bundles 18 around the mandrel 22.

Figure 5:
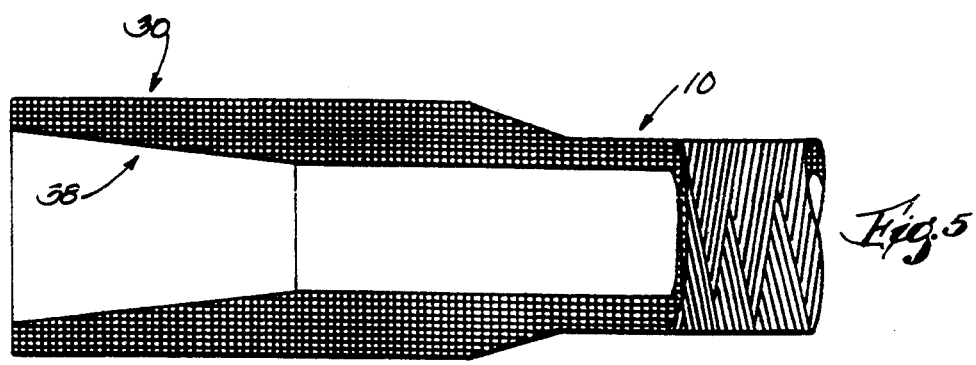
FIG. 5 is a view similar to FIG. 3 showing the pipe after the step of machining the inner surface.

The invention also comprises the step of machining the inner surface 38 of the bell-portion 30 so that the inner surface 38 is tapered and converges in the direction away from the adjacent end of the pipe 10. Preferably, the inner surface 38 is machined so as to be frustoconical. Any suitable conventional means can be used to machine the pipe 10. The resultant pipe 10 is partially illustrated in FIG. 5.

In the preferred embodiment, the mandrel 22 has a longitudinal axis 34, and the filament bundle 18 is wound around the mandrel 22 at an angle "A" (see FIG. 3) with respect to the mandrel axis 34. This angle is referred to as the "winding angle" or "reinforcement angle". In the preferred embodiment of the invention, 54.75 degrees is used for the wall winding angle and the reinforcement layer winding angle. For a six inch diameter pipe, a bell portion reinforcement length of 36 inches is used with a helical crossover sequential winding pattern.

Figure 1:
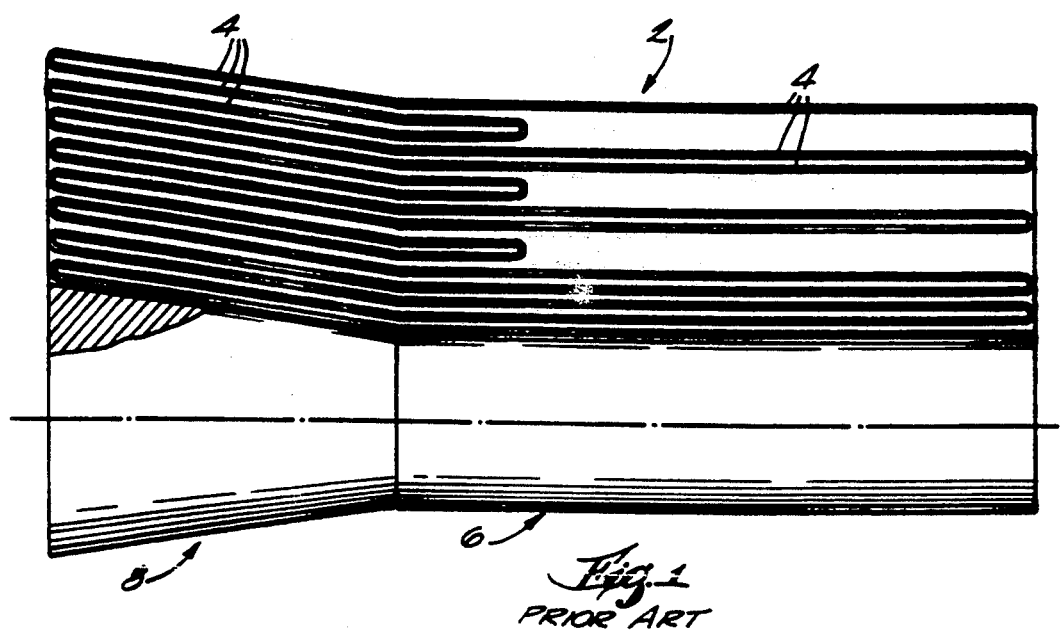
FIG. 1 is a schematic illustration of a prior art method of manufacturing a pipe.

In the conventional construction, a 54.75 degree reinforcement layer winding angle is used to produce pipe on a mandrel having a frustoconical surface portion 8, as shown in FIG. 1. This produces a pipe 2 which, if reinforced with the same amount of material, will fail first by a fracture in the bell portion of the pipe. When a pipe is produced according to this invention, the pipe 10 fails first by a fracture in the wall portion 26 of the pipe 10. In other words, the pipe bell portion 30 is stronger than the pipe wall portion 26. Many standards and codes require that a pipe joint (made by the bell portion 30) be stronger than the remainder of the pipe. Accordingly, this invention produces pipes with an integral bell portion which are better than those made by the conventional method.

Figure 6:
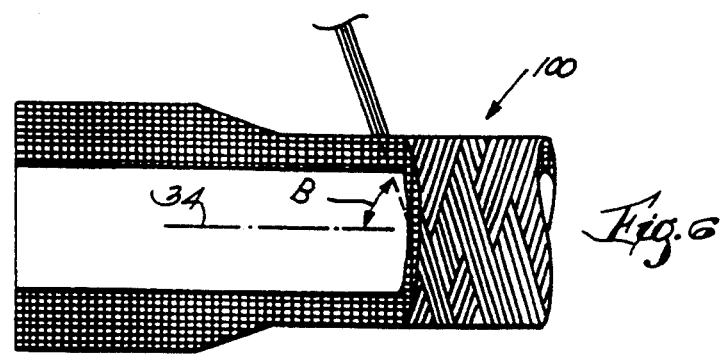
FIG. 6 is a view similar to FIG. 5 of another pipe being formed by the invention.

In other embodiments, as illustrated in FIG. 6, another reinforcement layer winding angle "B" can be used. Where the reinforcement layer winding angle is different than the wall winding angle, however, adjusting the winding process to produce this variable winding angle pipe can be an expensive.

Various features of the invention are set forth in the following claims.

I claim:

1. A method for manufacturing a filament reinforced plastic pipe including an integral bell, said method comprising the steps of impregnating a filament bundle with a resin, winding said filament bundle in a plurality of layers to form a pipe around a mandrel having an outer surface which is cylindrical along the entire length of said mandrel, the pipe having a wall thickness, winding additional layers of said filament bundle around a portion of said mandrel to form, adjacent an end of said pipe, a bell portion having a cylindrical inner surface, having a reinforcement length, and having an increased wall thickness, and machining said inner surface so that the wall thickness at said end of said pipe is less than the wall thickness at a point spaced from said end, and so that said inner surface includes a frustoconical portion which converges in the direction away from said end of said pipe, and which has a length less than said reinforcement length.

2. A method as set forth in claim 1 wherein said mandrel has a longitudinal axis, and wherein said additional layers of said filament bundle are wound at an angle of approximately 55 degrees with respect to said mandrel axis.

3. A method for manufacturing a filament reinforced plastic pipe having integral bells at both ends, said method comprising the steps of impregnating a filament bundle with a resin, providing a mandrel having a cylindrical outer surface, winding said filament bundle around said outer surface in a plurality of layers to form a pipe having opposite ends and having a wall thickness, winding additional layers of said filament bundle around portions of said mandrel adjacent said ends of said pipe to form, at each of said ends, a bell portion having a cylindrical inner surface, having a reinforcement length, and having an increased wall thickness, and machining said inner surface of each of said bell portions so that the wall thickness at the adjacent end of said pipe is less than the wall thickness at a point spaced from the adjacent end, and so that said inner surface includes a frustoconical portion which converges in the direction away from the adjacent end of said pipe, and which has a length less than said reinforcement length.

4. A method as set forth in claim 3 wherein said mandrel has a longitudinal axis, and wherein said additional layers of said filament bundle are wound at an angle of approximately 55 degrees with respect to said mandrel axis.

* * * * *